(12) United States Patent
Wen et al.

(10) Patent No.: US 8,200,769 B2
(45) Date of Patent: Jun. 12, 2012

(54) DOWNLOADING A PLUG-IN ON AN INSTANT MESSAGING CLIENT

(75) Inventors: Bo Wen, Hangzhou (CN); Liming Zhang, Hangzhou (CN); Wei Peng, Hangzhou (CN); Zhenguo Bai, Hangzhou (CN)

(73) Assignee: Alibaba Group Holding Limited (KY)

( * ) Notice: Subject to any disclaimer, the term of this patent is extended or adjusted under 35 U.S.C. 154(b) by 40 days.

(21) Appl. No.: 12/804,135

(22) Filed: Jul. 13, 2010

(65) Prior Publication Data

US 2011/0016184 A1 Jan. 20, 2011

(30) Foreign Application Priority Data

Jul. 17, 2009 (CN) .......................... 2009 1 0151423

(51) Int. Cl.
*G06F 15/16* (2006.01)
(52) U.S. Cl. ...................................................... 709/206
(58) Field of Classification Search .................... 709/206
See application file for complete search history.

(56) References Cited

U.S. PATENT DOCUMENTS

| 7,209,957 | B2 | 4/2007 | Patron et al. | |
| 7,356,567 | B2* | 4/2008 | Odell et al. | 709/206 |
| 7,401,158 | B2 | 7/2008 | Beauchamp et al. | |
| 7,411,939 | B1 | 8/2008 | Lamb et al. | |
| 7,818,379 | B1* | 10/2010 | Heikes et al. | 709/206 |
| 7,877,450 | B2* | 1/2011 | Odell et al. | 709/206 |
| 7,921,163 | B1* | 4/2011 | Odell et al. | 709/206 |
| 2004/0054740 | A1 | 3/2004 | Daigle et al. | |
| 2004/0064696 | A1 | 4/2004 | Daigle et al. | |
| 2006/0075083 | A1 | 4/2006 | Liu | |
| 2006/0075504 | A1 | 4/2006 | Liu | |
| 2006/0168015 | A1 | 7/2006 | Fowler | |
| 2007/0192426 | A1 | 8/2007 | Daigle et al. | |
| 2007/0244980 | A1 | 10/2007 | Baker et al. | |
| 2008/0288447 | A1* | 11/2008 | Thompson | 707/2 |
| 2008/0313632 | A1* | 12/2008 | Kumar et al. | 718/100 |
| 2009/0177792 | A1* | 7/2009 | Guo et al. | 709/231 |
| 2009/0248824 | A1* | 10/2009 | Best et al. | 709/206 |
| 2009/0288102 | A1* | 11/2009 | Ahmad et al. | 719/318 |

* cited by examiner

*Primary Examiner* — Wing Chan
*Assistant Examiner* — Alicia Baturay
(74) *Attorney, Agent, or Firm* — Van Pelt, Yi & James LLP

(57) ABSTRACT

Downloading a plug-in for an Instant. Messaging (IM) client includes receiving a request for the plug-in from a user of the IM client; detecting a directly accessible peer client that is currently online; sending a plug-in download request to the directly accessible peer client; and in the event that the plug-in is received from the directly accessible peer client, installing the plug-in on the IM client.

17 Claims, 4 Drawing Sheets

DOWNLOADING A PLUG-IN ON AN INSTANT MESSAGING CLIENT

CROSS REFERENCE TO OTHER APPLICATIONS

This application claims priority to People's Republic of China Patent Application No. 200910151423.2 entitled METHOD AND SYSTEM FOR DOWNLOADING PLUG-IN AND SYSTEM THEREOF filed Jul. 17, 2009 which is incorporated herein by reference for all purposes.

FIELD OF THE INVENTION

The present invention relates to the field of interaction over a network and in particular to management of plug-ins.

BACKGROUND OF THE INVENTION

A plug-in (also referred to as an add-on, add-in, snap-in, or extension) is typically a computer program that interacts with a core application or service platform, such as a web browser or other applications, to provide certain functions on demand. A plug-in typically complies with prescribed access requirements to a service platform and executables on the service platform. Examples of plug-ins include Dynamic Linkable Libraries (DLLs).

Instant Messaging (IM) refers to a service capable of instant transmission and reception of messages over the Internet. The IM software can provide knowledge of whether a contact is online as well as exchanging instant messages with the online contact. As used herein, a client on which the IM software is installed is referred to as an IM client. In practice, an IM client sometimes needs to download a plug-in to extend its capabilities.

Currently, an IM client downloads a plug-in using a point-to-point approach. Typically, there is a seed server for recording which clients possess what plug-in resources, address information of the respective clients (e.g., a Media Access Control (MAC) address, an Internet Protocol (IP) address, etc., of each client), etc. A client intending to download a plug-in resource may retrieve a "seed", i.e., a list of the plug-in resources, and attempt to connect to and download the required plug-in from a plug-in download server according to plug-in information recorded in the seed by the seed server.

As can be seen from the foregoing process, the existing approach of downloading a plug-in requires provision of the corresponding seed from the seed server, which occupies a significant amount of network resource. Moreover, the client has to update the latest plug-in information to the seed server upon completion of downloading and installing the plug-in, which may further increase the cost of maintaining the seed server and complicate the operations.

BRIEF DESCRIPTION OF THE DRAWINGS

Various embodiments of the invention are disclosed in the following detailed description and the accompanying drawings.

FIG. 3 is a flowchart illustrating another embodiment of a process for downloading a plug-in.

DETAILED DESCRIPTION

Figure 1:
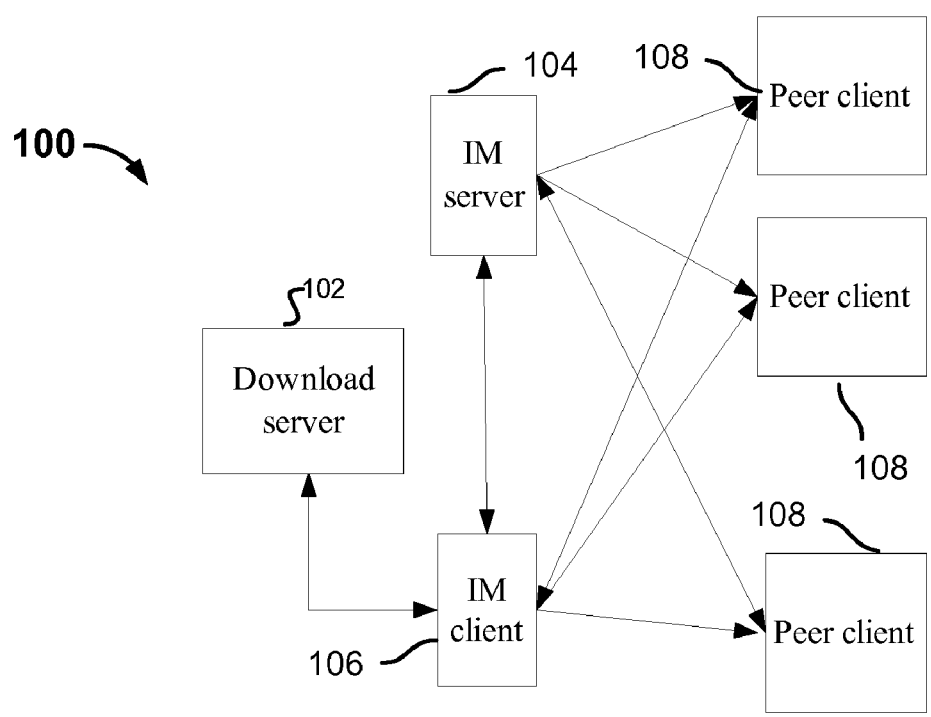
FIG. 1 is a block diagram of an embodiment of a system for supporting downloading of plug-ins to an IM client.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application can be applied in numerous general-purpose or dedicated computing device environments or configurations, such as a personal computer, a server computer, a handheld or portable device, a multi-processor device, a distributed computing environment including any of the foregoing devices, etc.

The present application can be described in a general context of computer executable instructions, e.g., a program module, for execution by a computer. Generally, the program module includes a routine, program, object, component, data structure, etc., which executes a specific task or embodies a specific abstract type of data. Alternatively, the present application can be implemented in a distributed computing environment in which a task is executed by a remote processing device connected over a communication network and in which the program module may be located in a local or remote computer storage medium including a storage device.

A plug-in downloading technique is described. In some embodiments, an Instant Messaging (IM) client receives a plug-in download request transmitted from a user, requests a plug-in from a directly accessible peer client based on the plug-in name and version information in the request, and receives the plug-in transmitted from the peer client if the plug-in is stored at the peer client.

FIG. 1 is a block diagram of an embodiment of a system for supporting downloading of plug-ins to an IM client. In the example shown, system 100 includes a download server 102, an IM server 104, an IM client 106, and one or more peer clients 108. The clients may be implemented using one or more computing devices such as a personal computer, a server computer, a handheld or portable device, a flat panel device, a multi-processor system; a microprocessor based system, a set-top box, a programmable consumer electronic device, a network PC, a minicomputer, a large-scale computer, a special purpose device, a distributed computing environment including any of the foregoing systems or devices, or other hardware/software/firmware combination that includes one or more processors and memory coupled to the processors and configured to provide the processors with instructions.

The peer clients are client devices also running IM applications and to which the IM client has contact. For example, if the user of IM client 106 has a list of contacts, who in turn are users of client 108, then IM client 106 and clients 108 are peer clients with respect to each other. In system 100, the IM server provides the IM client with address information of the latter's peer clients, including IP address information and MAC address information. If some of the peer clients are capable of online provision of the required plug-in to the IM client, the plug-in is sent from a suitable peer client to the IM client. If no peer client can provide the IM client with the plug-in, the IM client requests the plug-in directly from the download server.

Figure 2:
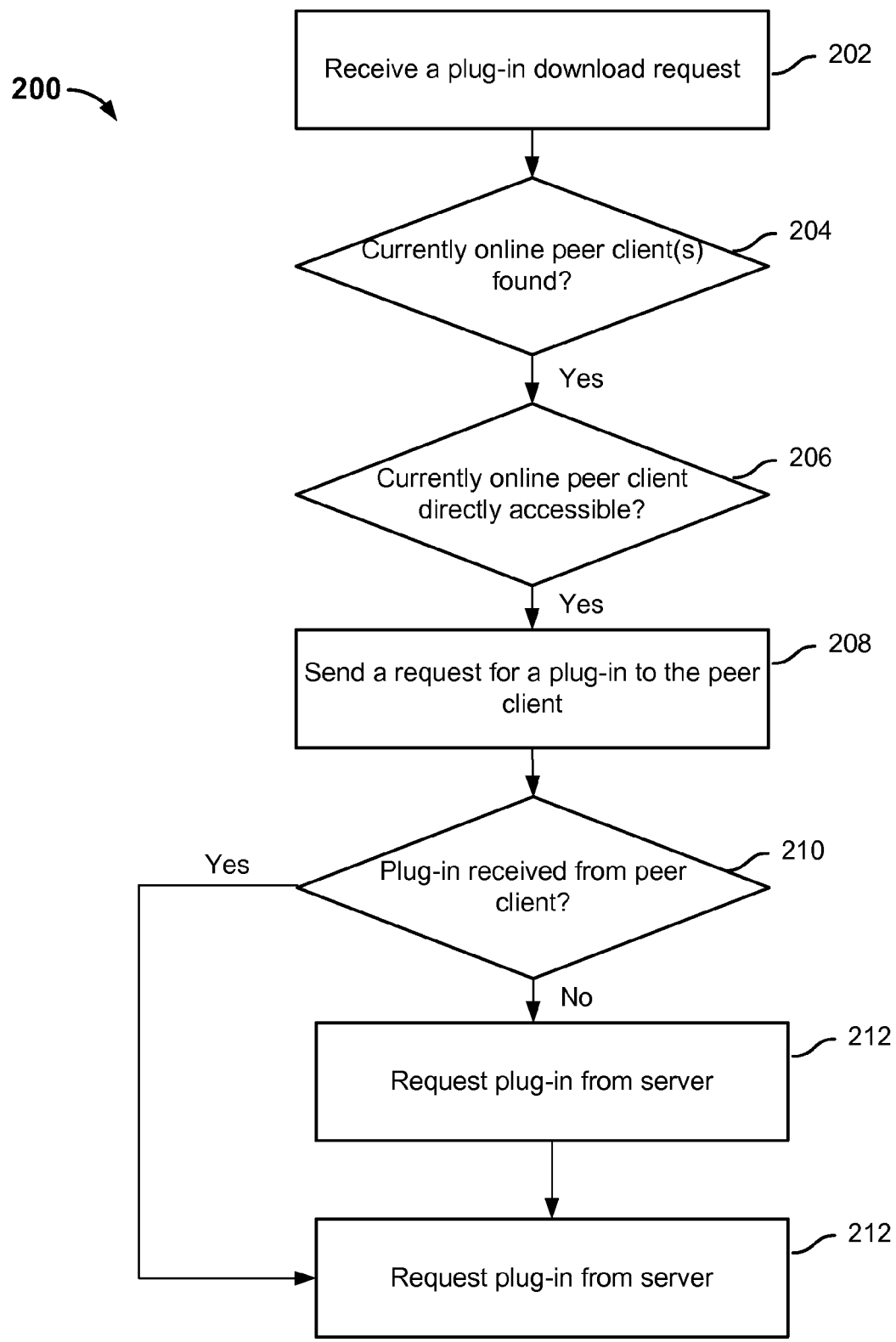
FIG. 2 is a flowchart illustrating an embodiment of a process for plug-in downloading.

FIG. 2 is a flowchart illustrating an embodiment of a process for plug-in downloading. The process may be performed on a system such as 100.

At 202, a plug-in download request transmitted from a user is received. A user transmits the plug-in download request to the IM client by, for example, clicking a Uniform Resource Locator (URL) link or a dialogue window for installation of a plug-in. The user may also click a plug-in promotion entry provided by an IM operator that includes a plug-in installation instruction, e.g., a URL, an entry push button on a primary user interface, a chat window, etc., or any other appropriate user interface widget. Furthermore, the user may click a pop-up promotion area supplied by an IM operator, typically a webpage area emerging from the system task bar, or accept a user agreement for installation of a plug-in as defaulted in the current system so that the system triggers installation of the plug-in by default.

In some embodiments, the plug-in download request includes plug-in name and version information for uniquely identifying a plug-in. In some embodiments, the plug-in download request triggered from the user is intercepted by a plug-in manger of the IM client, which is a function module of the IM client.

At 204, the IM client determines whether any peer client is currently online. In some embodiments, the peer clients are looked up using a list of contacts stored on the IM client. When a user logs on to the IM client, the IM client sends the list of contacts to the IM server, which finds currently online peer clients on which the contacts push statuses of the peer clients to the IM client when the IM client logs thereon and also push an updated status of any of the peer clients to the IM client when the status of the peer client is changed.

If so, at 206, it is determined whether any currently online peer client is directly accessible. As used herein, "directly accessible" means that the IM client and the peer client are capable of exchanging messages directly without an IM server. Particularly, the peer client is also an IM client connected with the IM server for instant messaging. It is possible to detect whether there is a peer client directly accessible to the IM client according to IP address information in a list of address information of contacts that is recorded at the IM client. In some embodiments, a time limit is set for the identification. The time limit can be set as required practically for the IM client or dependent on an actual operating condition of the network, e.g., 10 seconds. An example list of address information of contacts is shown as follows:

| Username | MAC address | IP address |
|----------|-------------|------------|
| Zhang    | 001122FFEE  | 20.1.4.88  |
| Li       | 11FEAC44    | 22.2.6.7   |
| ...      | ...         | ...        |

In some embodiments, whether there is a directly accessible peer client is determined based on the IP address information of the peer client. Some IP addresses include an address segment belonging to a public network and an address segment belonging to a private network such as a local area network. When the IP address of the peer client belongs to an address of a public network, e.g., an IP address of a well-known webpage hosting company, direct IP messaging with the IM client without the IM server becomes possible. In contrast, if the IP address of the peer client belongs to a local area network/intranet, it is likely that the peer client is not directly accessible due to special setting parameters employed by the private network.

If one or more currently online and directly accessible peer clients are detected, at 208, the IM client sends a request for a plug-in, including the plug-in name and version information, to the peer client. In some embodiments, the IM client first sends a connection request (such as a TCP connection request) to the peer client and only sends the plug-in request if the connection is successfully established. A timeout period of 10 seconds is configured in some embodiments. If no connection is established after 10 seconds, the IM client's attempt to request for plug-in from this peer client is deemed to have failed.

At 210, it is determined whether the plug-in is successfully received from the peer client. In some embodiments, after the expiration of a preconfigured timeout period, if nothing is received from the peer client to which the request was sent, the request is deemed to have failed.

In some embodiments, if no plug-in is available at the peer client, it sends a message indicating absence of the plug-in to the IM client.

If multiple peer clients are directly accessible, should one of them fail to send the plug-in, the IM client can retry with the next peer client, until the plug-in is successfully received, or until it is determined that none of the peer client is able to supply the plug-in. In some embodiments, the order in which the peer clients are selected is random. In some embodiments, peer clients that are on the same network as the IM client or are operated by the same operator are selected first. The selection can be based on the address of the peer clients. The plug-in requests can be made serially or in parallel, depending on network conditions such as bandwidth available.

If no plug-in is received from the peer clients, if there is no peer client online, or if there is no directly accessible peer client, at 212, the IM client makes plug-in download request to the download server.

At 214, the plug-in is installed on the IM client and the plug-in name and version information are stored.

Since the peer client information is stored on the IM client, the above process does not require an additional seed server. Server resource and network resource are therefore conserved.

Figure 3:
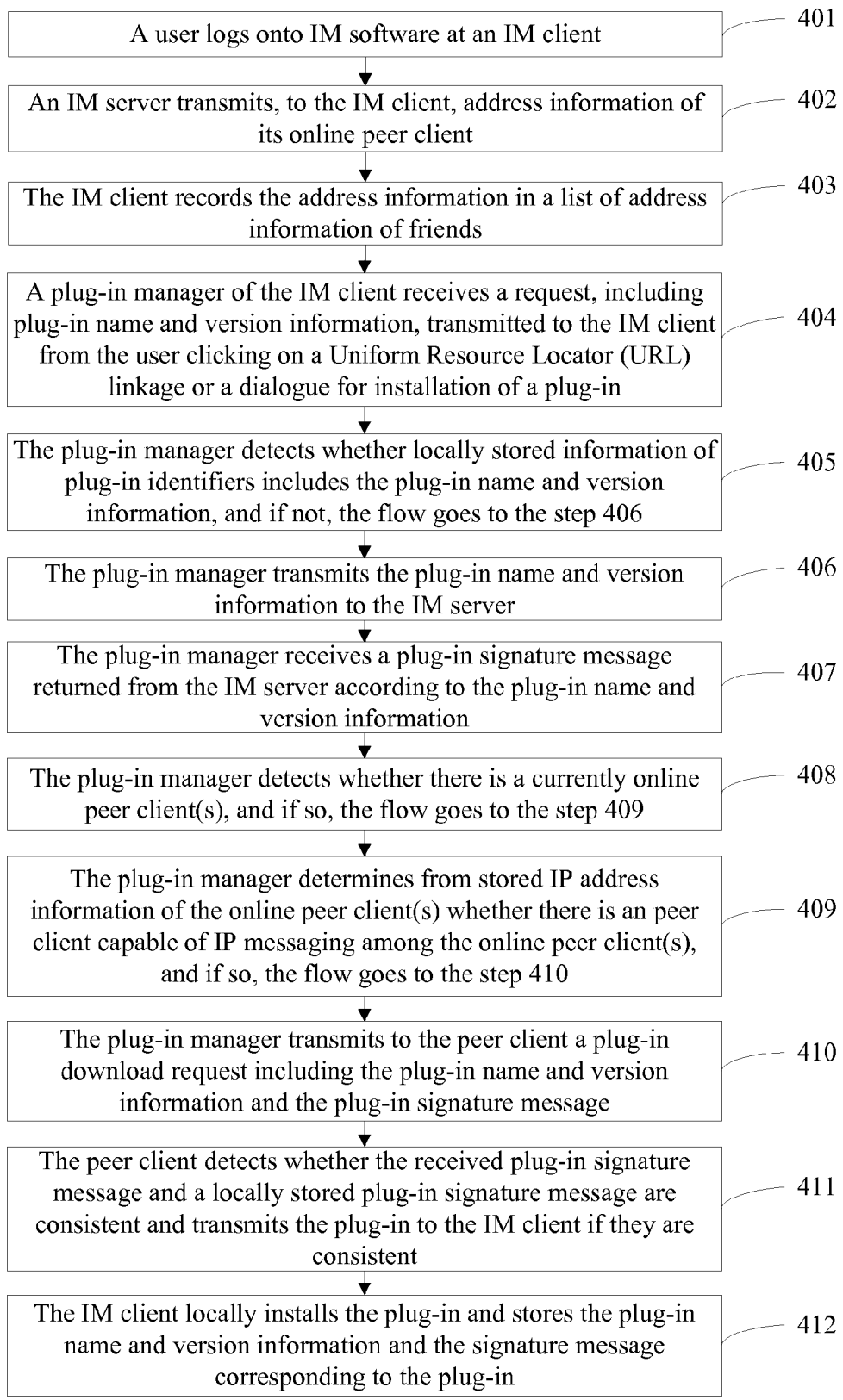

FIG. 3 is a flowchart illustrating another embodiment of a process for downloading a plug-in. The process may be performed on a system such as 100.

At 401, a user logs onto IM software executing on an IM client.

After the user logs onto the IM software, at 402, an IM server transmits to the IM client address information of peer clients that are online.

At 403, the IM client records the address information in a list of address information of contacts.

At 404, a plug-in manager of the IM client receives a request, including plug-in name and version information, transmitted to the IM client from the user clicking on a Uniform Resource Locator (URL) linkage or a dialogue for installation of a plug-in.

When clicking on a Uniform Resource Locator (URL) linkage or a dialogue for installation of a plug-in, the user transmits a request to the IM server. The request is first intercepted by the IM client, which in turn performs subsequent operations. The request includes plug-in name and version information to identify the plug-in uniquely.

At 405, the plug-in manager detects whether locally stored information of plug-in identifiers include the plug-in name and version information and if not, the flow goes to 406.

In the present embodiment, the plug-in manager detects whether locally stored information of plug-in identifiers includes the plug-in name and version information. If true, the plug-in manager directly retrieves the plug-in name and version information locally.

At 406, the plug-in manager transmits the plug-in name and version information to the IM server.

At 407, the plug-in manager receives a plug-in signature message returned from the IM server according to the plug-in name and version information. After the plug-in manager transmits the plug-in name and version information to the IM server, the IM server retrieves a plug-in signature message which is a hash value of the Message-Digest Algorithm 5 (MD5) to identity uniquely an installation packet message of the plug-in used to determine whether the plug-in is modified. The IM server transmits the signature message to the IM client.

At 408, the plug-in manager detects whether there is any currently online peer client and if so, the flow goes to the step 409.

At 409, the plug-in manager determines from stored IP address information of the online peer client(s) whether there is a peer client capable of IP messaging among the online peer clients and if so, the flow goes to the step 410.

At 410, the plug-in manager transmits in a preset period of time to the peer client a plug-in download request, which includes the plug-in name and version information and the plug-in signature message.

In the present example, a difference from the foregoing two embodiments lies in that the plug-in manager transmits to the peer client a plug-in download request including the plug-in name and version information and also the plug-in signature message.

At 411, the peer client detects whether the received plug-in signature message and a locally stored plug-in signature message are consistent and transmits the plug-in to the IM client if they are consistent.

The peer client detects whether the received plug-in signature message and a locally stored plug-in signature message are consistent and returns a message indicating an error or absence of the plug-in to the IM client if they are inconsistent; at this time, the IM client may download the corresponding plug-in directly from a download server or the peer client transmits the plug-in to the IM client if they are consistent.

At 412, the IM client locally installs the plug-in and stores the plug-in name and version information and the signature message corresponding to the plug-in.

If the plug-in required by the IM client is absent at all the peer clients, the peer clients can further transmit the plug-in request to their own respective peer clients until one of the peer clients can locate a peer client storing the plug-in or the friend client can further transmit the plug-in request to its friend until the plug-in is located. The plug-in can alternatively be downloaded from the download server if it has been not retrieved in a period of time, the length of which can be set depending on an actual network condition.

The foregoing respective embodiments of the method have been described as a combination of a series of actions for convenient description, but those skilled in the art shall appreciate that the present application will not be limited to any sequence of actions as described because some of the steps may be performed in another sequence or concurrently without departing from the scope of the present application. Secondly, those skilled in the art shall also appreciate that all the embodiments described in the specification are preferred embodiments and the actions and modules as mentioned are not necessarily indispensable to the present application.

Figure 4:
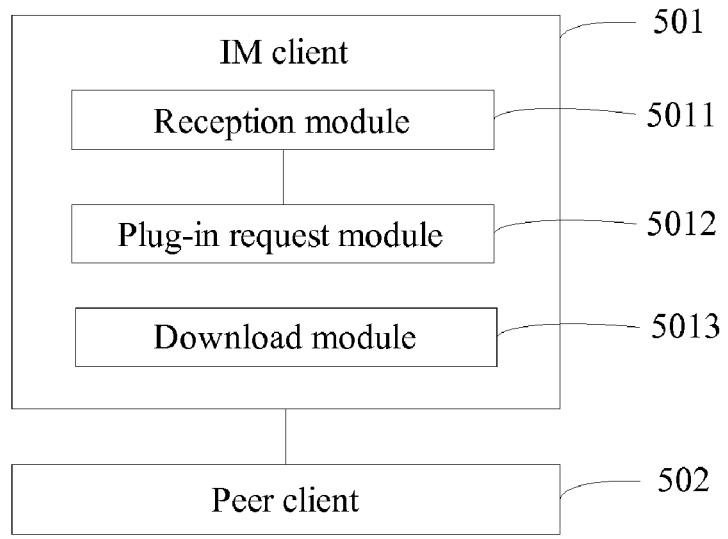
FIG. 4 is a block diagram illustrating an embodiment of an IM client.

FIG. 4 is a block diagram illustrating an embodiment of an IM client. In this example, IM client 501 includes a reception module 5011, a plug-in request module 5012, and a download module 5013.

Reception module 5011 is adapted to receive a plug-in download request transmitted from a user. Plug-in request module 5012 is adapted to request a plug-in from a directly accessible peer client such as 502 in response to the plug-in download request upon detecting the peer client. A preset time period is configured. If no plug-in is downloaded from the peer client when the preset period of time expires, download module 5013 is used to download the plug-in directly from a download server.

The user can transmit the plug-in download request to the IM client variously in practice, for example, by clicking a Uniform Resource Locator (URL) linkage or a dialogue window for installation of a plug-in. The user may also click a plug-in promotion entry provided from an IM operator that includes a plug-in installation instruction, e.g., a URL, an entry push button on a primary user interface, a chat window, etc., or another similar entry. Furthermore, the user may click in the promotion area of an IM operator, typically a page area emerging at the bottom right corner of a system task bar. Moreover, the user may accept a user agreement for installation of a plug-in as defaulted in the current system so that the system triggers installation of the plug-in by default.

The plug-in download request may include plug-in name and version information by which a plug-in can be identified uniquely. In a practical application, the plug-in download request triggered from the user can be intercepted by a plug-in manger of the IM client, which is a function module of the IM client.

The peer client 502 is adapted to transmit the plug-in to the IM client. On receiving the plug-in download request transmitted from the IM client, the peer client can first detect locally whether the plug-in is present and transmit the plug-in to the IM client if it is present. If the plug-in is absent, the peer client returns a message indicating absence of the plug-in to the IM client, so that plug-in request module 5012 may further request the plug-in from another directly accessible peer client until the requested plug-in is available.

In the present embodiment, the IM client detects whether there is a directly accessible peer client on reception of the plug-in download request, requests the required plug-in directly from such a peer client on detection of the peer client and receives the plug-in transmitted from the peer client. No additional seed server is required and the downloading process is simpler to implement than if an additional seed server is used.

Figure 5:
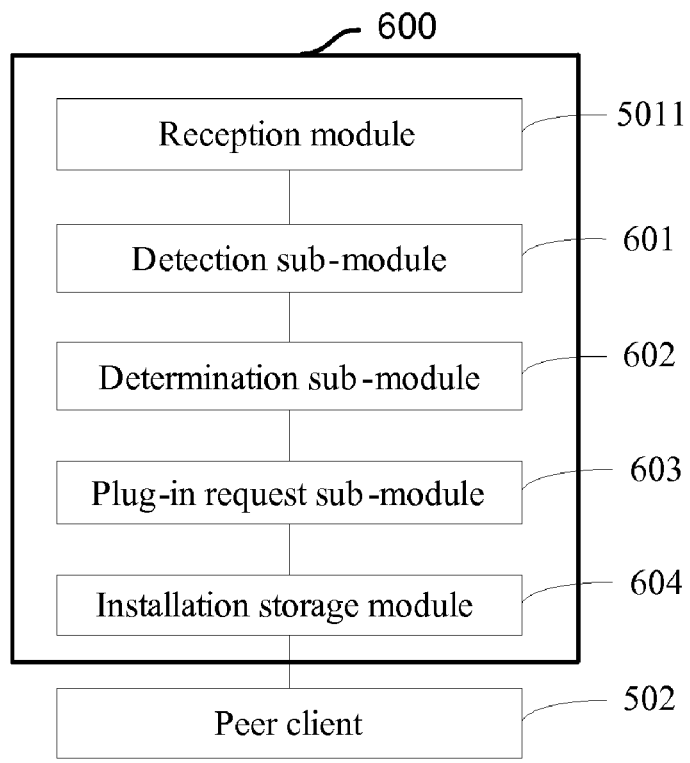
FIG. 5 is a block diagram illustrating another embodiment of an IM client.

FIG. 5 is a block diagram illustrating another embodiment of an IM client. In this example, IM client 600 includes a reception module 5011, a detection sub-module 601, a determination sub-module 602, a plug-in request sub-module 603, and an installation storage module 604.

Reception module 5011 is adapted to receive a plug-in download request, including plug-in name and version information, transmitted from a user.

Detection sub-module 601 is adapted to detect whether there is any peer client(s) currently online. The detection sub-module may search for the number of online peer clients in a list of address information of contacts at the IM client, all of which are clients of all the contacts added at the IM client in an embodiment of the present application. Particularly, an IM server pushes statuses of the peer clients to the IM client when the IM client logs thereon and also pushes an updated status of any of the peer clients to the IM client when the status of the peer client is changed.

If the detection sub-module 601 detects no currently online peer client, the IM client requests the plug-in directly from a download server.

Determination sub-module 602 is adapted to determine, if the detection sub-module indicates that there is one or more online peer clients, from stored IP address information of the online peer clients, whether there is a peer client capable of IP messaging among the online peer clients.

The IM server pushes the address information of the online peer clients to the IM client when the IM client logs on and the IM client stores the address information. Based on the IP address information, it is determined whether the online peer clients belong to a public network or a local area network and whether the peer clients and the IM client are capable of direct IP messaging. The hosting sites/operators of the IM client and the online peer clients are also determined based on their respective IP address information to further select preferentially one of the peer clients on the same hosting site for downloading.

If the determination sub-module gives a positive result, plug-in request sub-module 603 is adapted to request the plug-in from the peer client using the plug-in identifier information.

In the example shown, the plug-in request sub-module 603 includes a connection request sub-module, adapted to initiate a connection setup request to one of the directly accessible peer clients if the determination sub-module gives a positive result; a request sub-module, adapted to transmit the plug-in download request to the peer client on success of setting up a connection; and a sequential request sub-module, adapted to initiate a connection setup request sequentially to the other peer clients on failure of setting up a connection.

Installation storage module 604 is adapted to locally install the plug-in and store the plug-in name and version information corresponding to the plug-in.

In some embodiments, the reception module is further configured to receive a plug-in signature message from the IM server. Alternatively, a second reception module is configured and used for this purpose in some embodiments.

In some embodiments, the detection module is further configured to detect whether locally stored information of plug-in identifiers includes the plug-in name and version information.

In some embodiments, an additional transmission module is adapted to transmit the plug-in name and version information to the IM server.

In some embodiments, the reception module is further adapted to receive a plug-in signature message returned from the IM server according to the plug-in name and version information. Alternatively, a second reception module is configured in some embodiments for this purpose.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for downloading a plug-in for an Instant Messaging (IM) client, comprising:
   receiving a request for the plug-in from a user of the IM client;
   detecting a directly accessible peer client that is currently online;
   sending a plug-in download request to the directly accessible peer client;
   in the event that the plug-in is received from the directly accessible peer client, installing the plug-in on the IM client; wherein:
   the plug-in download request comprises a plug-in name and version information; and
   after receiving a request for the plug-in from the user of the IM client, the method further comprises:
   transmitting the plug-in name and version information to an IM server; and
   receiving a plug-in signature message from the IM server, the plug-in signature message being generated based at least in part on the plug-in name and the version information;
   sending the plug-in name, the version information, and the plug-in signature message to the directly accessible peer client for comparison with locally stored plug-in signature messages on the directly accessible peer client.

2. The method of claim 1, in the event that the plug-in is not successfully received from the directly accessible peer client, sending the plug-in download request to a download server.

3. The method of claim 1, wherein detecting the directly accessible peer client that is currently online includes:
   detecting, based on a contact list of the IM client, whether there is one or more currently online peer clients; and
   in the event that there is one or more currently online peer clients, determining from address information of the one or more online peer clients whether there is a directly accessible peer client that is capable of directly exchanging messages with the IM client without going through a server.

4. The method of claim 1, wherein sending a plug-in download request to the directly accessible peer client comprises:
   initiating a connection setup request to the directly accessible peer client;
   in the event that the connection is successfully set up, transmitting the plug-in download request to the directly accessible peer client; and
   in the event that the connection is not successfully set up, sending the plug-in download request to a different directly accessible peer client.

5. The method of claim 1, wherein after receiving the request for the plug-in from the user, the method further comprises:
   determining whether locally stored plug-in identification information includes the plug-in name and the version information; and
   in the event that the locally stored plug-in identification information does not include the plug-in name or version information, sending the plug-in download request to the directly accessible peer client.

6. The method of claim 1, further comprising storing plug-in name and version information corresponding to the plug-in.

7. The method of claim 1, wherein the request for the plug-in from the user is made by one or more of:
   user selection of a Uniform Resource Locator, URL, linkage or a dialogue for installation of the plug-in;
   user selection of an emerging promotion area comprising a plug-in installation instruction;
   user selection of a plug-in promotion entry comprising a plug-in installation instruction; and
   user acceptance of a user agreement for installation of the plug-in as defaulted in a current system.

8. The method of claim 1, wherein the directly accessible peer client is one of a plurality of directly accessible peer clients.

9. A system for downloading a plug-in for an Instant Messaging (IM) client, comprising:
   one or more interfaces configured to receive a request for the plug-in from a user of the IM client;
   one or more processors configured to:
      detect a directly accessible peer client that is currently online;
      cause a plug-in download request to be sent to the directly accessible peer client;
      in the event that the plug-in is received from the directly accessible peer client, install the plug-in on the IM client; wherein:
      the plug-in download request comprises a plug-in name and version information; and
      after receiving a request for the plug-in from the user of the IM client, the one or more processors are further configured to:
      transmit the plug-in name and version information to an IM server; and
      receive a plug-in signature message from the IM server, the plug-in signature message being generated based at least in part on the plug-in name and the version information;
      send the plug-in name, the version information, and the plug-in signature message to the directly accessible peer client for comparison with locally stored plug-in signature messages on the directly accessible peer client; and
   one or more memories coupled to the one or more processors, configured to provide the processors with instructions.

10. The system of claim 9, in the event that the plug-in is not successfully received from the directly accessible peer client, the one or more processors further being configured to send the plug-in download request to a download server.

11. The system of claim 9, wherein detecting the directly accessible peer client that is currently online includes:
   detecting, based on a contact list of the IM client, whether there is one or more currently online peer clients; and
   in the event that there is one or more currently online peer clients, determining from address information of the one or more online peer clients whether there is a directly accessible peer client that is capable of directly exchanging messages with the IM client without going through a server.

12. The system of claim 9, wherein sending a plug-in download request to the directly accessible peer client comprises:
   initiating a connection setup request to the directly accessible peer client;
   in the event that the connection is successfully set up, transmitting the plug-in download request to the directly accessible peer client; and
   in the event that the connection is not successfully set up, sending the plug-in download request to a different directly accessible peer client.

13. The system of claim 9, wherein after receiving the request for the plug-in from the user, the one or more processors are further configured to:
   determine whether locally stored plug-in identification information includes the plug-in name and the version information; and
   in the event that the locally stored plug-in identification information does not include the plug-in name or version information, send the plug-in download request to the directly accessible peer client.

14. The system of claim 9, wherein the one or more memories are further configured to store plug-in name and version information corresponding to the plug-in.

15. The system of claim 9, wherein the request for the plug-in from the user is made by one or more of:
   user selection of a Uniform Resource Locator, URL, linkage or a dialogue for installation of the plug-in;
   user selection of an emerging promotion area comprising a plug-in installation instruction;
   user selection of a plug-in promotion entry comprising a plug-in installation instruction; and
   user acceptance of a user agreement for installation of the plug-in as defaulted in a current system.

16. The system of claim 9, wherein the directly accessible peer client is one of a plurality of directly accessible peer clients.

17. A computer program product for downloading a plug-in for an Instant Messaging (IM) client, the computer program product being embodied in a non-transitory computer readable storage medium and comprising computer instructions for:
   receiving a request for the plug-in from a user of the IM client;
   detecting a directly accessible peer client that is currently online;
   sending a plug-in download request to the directly accessible peer client;
   in the event that the plug-in is received from the directly accessible peer client, installing the plug-in on the IM client; wherein:
   the plug-in download request comprises a plug-in name and version information; and
   after receiving a request for the plug-in from the user of the IM client, the method further comprises:
   transmitting the plug-in name and version information to an IM server; and
   receiving a plug-in signature message from the IM server, the plug-in signature message being generated based at least in part on the plug-in name and the version information;
   sending the plug-in name, the version information, and the plug-in signature message to the directly accessible peer client for comparison with locally stored plug-in signature messages on the directly accessible peer client.

* * * * *